(12) United States Patent
Zhao et al.

(10) Patent No.: US 11,473,238 B2
(45) Date of Patent: Oct. 18, 2022

(54) WATER-REPELLENT AND LIPOPHILIC COMPOSITE NEEDLE-PUNCHED NONWOVEN FABRIC AND PREPARATION METHOD THEREOF

(71) Applicants: NANTONG TEXTILE & SILK INDUSTRIAL TECHNOLOGY RESEARCH INSTITUTE, Nantong (CN); SOOCHOW UNIVERSITY, Suzhou (CN)

(72) Inventors: Huijing Zhao, Nantong (CN); Yingmei Zhang, Nantong (CN)

(73) Assignees: NANTONG TEXTILE AND SILK INDUSTRIAL TECHNOLOGY RESEARCH INSTITUTE, Jiangsu (CN); SOOCHOW UNIVERSITY, Jiangsu (CN)

( * ) Notice: Subject to any disclaimer, the term of this patent is extended or adjusted under 35 U.S.C. 154(b) by 379 days.

(21) Appl. No.: 16/606,755

(22) PCT Filed: Aug. 16, 2018

(86) PCT No.: PCT/CN2018/100820
§ 371 (c)(1),
(2) Date: Oct. 20, 2019

(87) PCT Pub. No.: WO2020/029315
PCT Pub. Date: Feb. 13, 2020

(65) Prior Publication Data
US 2021/0404114 A1     Dec. 30, 2021

(30) Foreign Application Priority Data
Aug. 8, 2018   (CN) .......................... 201810897693.7

(51) Int. Cl.
| | |
|---|---|
| *D06N 3/00* | (2006.01) |
| *D04H 1/43* | (2012.01) |
| *D04H 1/4291* | (2012.01) |
| *D04H 1/435* | (2012.01) |
| *D04H 1/46* | (2012.01) |
| *D04H 3/005* | (2012.01) |
| *D04H 3/011* | (2012.01) |
| *D04H 3/105* | (2012.01) |
| *D04H 3/153* | (2012.01) |
| *D06M 13/525* | (2006.01) |
| *D06M 15/00* | (2006.01) |

(Continued)

(52) U.S. Cl.
CPC ......... *D06N 3/0011* (2013.01); *D04H 1/4291* (2013.01); *D04H 1/435* (2013.01); *D04H 1/43835* (2020.05); *D04H 1/46* (2013.01); *D04H 3/005* (2013.01); *D04H 3/011* (2013.01); *D04H 3/105* (2013.01); *D04H 3/153* (2013.01); *D06B 1/14* (2013.01); *D06M 13/525* (2013.01); *D06M 15/00* (2013.01); *D06N 3/0036* (2013.01); *D06N 3/0038* (2013.01); *D06N 3/0088* (2013.01); *D06M 2101/30* (2013.01); *D06M 2101/32* (2013.01); *D06M 2200/12* (2013.01); *D06N 2209/142* (2013.01)

(58) Field of Classification Search
CPC .. D06N 3/0011; D06N 3/0036; D06N 3/0038; D06N 3/0088; D06N 2209/142; D04H 1/43835; D04H 1/4291; D04H 1/435; D04H 1/005; D04H 1/011; D04H 1/105; D04H 1/153; D04B 1/14; D06M 13/525; D06M 15/00; D06M 2101/30; D06M 2101/32; D06M 2200/12
See application file for complete search history.

(56) References Cited

U.S. PATENT DOCUMENTS

| | | | | |
|---|---|---|---|---|
| 4,515,854 | A  * | 5/1985 | Kogame | .............. D06N 3/0004 |
| | | | | 442/329 |
| 2010/0189993 | A1* | 7/2010 | Mori | .......................... C08J 7/05 |
| | | | | 428/317.5 |

FOREIGN PATENT DOCUMENTS

| | | |
|---|---|---|
| CN | 102953268 A | 3/2013 |
| CN | 105002656 A | 10/2015 |

(Continued)

OTHER PUBLICATIONS

"CN107227619_Machine Translation" is a machine translation of CN-107227619-A. (Year: 2017).*

(Continued)

*Primary Examiner* — Amina S Khan
(74) *Attorney, Agent, or Firm* — SZDC Law PC

(57) ABSTRACT

The invention relates to a water-repellent and lipophilic composite needle-punched nonwoven fabric and a preparation method thereof. The method comprises the following steps: blending a PET fiber and a polyolefin-based fiber in a mass ratio of 3:1-1:3, and performing needle punching to obtain a composite needle-punched nonwoven fabric; carrying out hot-drying treatment on the composite needle-punched nonwoven fabric at 110-160° C. for 40-90 min; and carrying out water-repellent finishing on the hot-dried fabric using 50-70 mL/L of an aqueous solution of a modified resin-based fluorine-free waterproofing agent, and drying to obtain the water-repellent and lipophilic composite needle-punched nonwoven fabric, wherein the water-repellent finishing is dip rolling, the air pressure is 1.8 kPa and the liquid carrying rate is 160-230%. The preparation method of the invention is simple, and the prepared composite needle-punched nonwoven fabric has significantly improved water repellency, lipophilicity and tensile strength compared with the fabric before treatment.

8 Claims, 4 Drawing Sheets

(51) Int. Cl.
*D04H 1/4382* (2012.01)
*D06B 1/14* (2006.01)
*D06M 101/30* (2006.01)
*D06M 101/32* (2006.01)

(56) References Cited

FOREIGN PATENT DOCUMENTS

| CN | 104246078 B | | 12/2015 |
|----|-------------|---|---------|
| CN | 107227619 A | * | 10/2017 |
| CN | 107227619 A | | 10/2017 |
| CN | 108297517 A | | 7/2018 |

OTHER PUBLICATIONS

Jiang Huai et al., Development and application of automotive textiles, Donghua University Press, published on Apr. 3, 2009, p. 169.

* cited by examiner

WATER-REPELLENT AND LIPOPHILIC COMPOSITE NEEDLE-PUNCHED NONWOVEN FABRIC AND PREPARATION METHOD THEREOF

This application is the National Stage Application of PCT/CN2018/100820, filed on Aug. 16, 2018, which claims priority to Chinese Patent Application No.: 201810897693.7, filed on Aug. 8, 2018, which is incorporated by reference for all purposes as if fully set forth herein.

FIELD OF THE INVENTION

The present invention relates to the field of textile finishing, and more particularly to a water-repellent and lipophilic composite needle-punched nonwoven fabric and a preparation method thereof.

DESCRIPTION OF THE RELATED ART

With the development of science and technology, crude oil leakage and discharge of factory oily wastewater have a great impact on the marine and river environment, and pose a threat to the human environment. Water-repellent and lipophilic materials have special wettability, and can absorb oily liquids in water, but do not absorb excess water, which causes water-oil separation, and thus a water source can be purified.

The use of water-repellent and lipophilic materials to treat oil pollution is a low-cost and high-efficiency method. The construction of water-repellent and lipophilic surfaces based on textiles increases the application value of textiles. In recent years, the development momentum of nonwoven technology is advanced rapidly. Compared with conventional weaving methods, such a preparation process is simple, the production speed is fast and the output is high. A synthetic fiber mainly comprises lipophilic organic groups without a certain number of hydrophilic groups on the macromolecular backbone thereof, and has good similarity-intermiscibility characteristic with various oily molecules, and thus has certain hydrophobicity and lipophilicity.

Chinese Patent CN102953268A discloses a preparation method of a super-lipophilic and super-hydrophobic oil-water separation polyester textile. Although a fluorine-free waterproofing agent is used for fabric treatment, the preparation method is complicated, and the tensile strength of the textile is not improved after the treatment. Chinese Document "Study on Preparation and Properties of Modified MBPP/Water-repellent PET Composite Oil-absorbing Materials, Wang Dan et al., INDUSTRIAL TEXTILES, 2016, (1): 6-11, 44" discloses a preparation method of a PET-based composite oil-absorbing material. Although the fabric is treated with a fluorine-free waterproofing agent, the composite material prepared by the method has an unsatisfactory oil absorption rate when used repeatedly, and the strength of the fabric is not significantly improved.

At present, the use of water-repellent and lipophilic materials to deal with oil pollution is still in the research and development stage, so the existing water-repellent and lipophilic products still have certain problems, such as complex production process, poor comprehensive performance of products, low oil-water separation efficiency, high product costs, and poor absorption capacity, and especially in case of water-repellent treatment in the lipophilic process, excessive or insufficient water absorption may easily occur.

SUMMARY OF THE INVENTION

To solve the foregoing technical problems, an object of the present invention is to provide a water-repellent and lipophilic composite needle-punched nonwoven fabric and a preparation method thereof. The preparation method is simple, and the prepared composite needle-punched nonwoven fabric has significantly improved water repellency, lipophilicity and tensile strength compared with the fabric before treatment.

In an aspect, the present invention provides a preparation method of a water-repellent and lipophilic composite needle-punched nonwoven fabric, comprising the following steps:

(1) blending a PET fiber and a polyolefin-based fiber in a mass ratio of 3:1-1:3, and performing needle punching to obtain a composite needle-punched nonwoven fabric;

(2) carrying out hot-drying treatment on the composite needle-punched nonwoven fabric at 110-160° C. for 40-90 min; and (3) carrying out water-repellent finishing on the hot-dried fabric using 50-70 mL/L of an aqueous solution of a modified resin-based fluorine-free waterproofing agent, and drying to obtain the water-repellent and lipophilic composite needle-punched nonwoven fabric, wherein the water-repellent finishing is dip rolling, the air pressure of dip rolling is 1.8 kPa and the liquid carrying rate of dip rolling is 160-230%.

Preferably, in step (1), the polyolefin-based fiber is selected from the group consisting of polyethylene (PE) fiber, polypropylene (PP) fiber, and ES fiber (PE-PP composite fiber) and any combination thereof. More preferably, the polyolefin-based fiber is an ES fiber.

In the present invention, the PET (polyester) fiber used is obtained by polymerizing ethylene terephthalate, and the structural formula of the ethylene terephthalate is

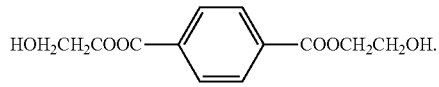

The ES fiber is obtained by grafting PE and PP (the PE and the PP are respectively obtained by polymerizing monomers

Both PET and ES bicomponent fibers are synthetic fibers with poor hygroscopicity. Polyester monomers, PP, and PE are all non-polar structures of macromolecules, and have high crystallinity and do not contain hydrophilic groups, and thus have a certain water-repellent effect. Moreover, the ES bicomponent fiber has unique thermal bonding properties and can be bonded to other materials under heat treatment conditions to form a fiber reinforced material.

Preferably, in step (1), the mass ratio of the PET fiber and the polyolefin-based fiber is 3:1, 1:1 or 1:3.

In a preferable embodiment, in step (1), the blended fibers are processed by a needle punching process to obtain a composite needle-punched nonwoven fabric. The surface of the composite needle-punched nonwoven fabric itself exhibits a certain roughness. The needle punching process includes the following steps:

opening and mixing the PET fiber and the polyolefin-based fiber, carding, lapping and pre-needle punching, then folding the pre-needle-punched fabric in half, to perform main needle punching.

Preferably, in step (2), the hot-drying treatment temperature is 120-130° C., and the hot-drying treatment time is 60-70 min.

By means of the hot-drying treatment in step (2), the surface of the ES hot-melt fiber, the PE fiber or the PP fiber is changed, so that not only the mechanical properties of the nonwoven fabric can be increased, but also the fluorine-free waterproofing agent can be more uniformly dispersed, thereby improving its water repellency.

Preferably, in step (3), the modified resin-based fluorine-free waterproofing agent is a cationic modified resin-based fluorine-free waterproofing agent, and the modified resin-based fluorine-free waterproofing agent has a pH of 3.5-4.5.

Preferably, in step (3), the modified resin-based fluorine-free waterproofing agent is a HOLPOSON ECO-0C fluorine-free waterproofing agent. The HOLPOSON ECO-0C fluorine-free waterproofing agent for water-repellent finishing is a fluorine-free environmentally-friendly single waterproofing finishing agent. The fluorine-free waterproofing agent can reduce the surface tension of the fabric and make its surface tension lower than water but higher than oil. Therefore, the fluorine-free waterproofing agent only gives the fabric a waterproof function, but has no effect on its lipophilic function.

Preferably, in step (3), the liquor ratio of the modified resin-based fluorine-free waterproofing agent to the fabric is 10:1-20:1.

Preferably, in step (3), the water-repellent finishing is a two-dip two-rolling process.

Preferably, in step (3), the liquid carrying rate is 200-230%.

Preferably, in step (3), the drying temperature is 60-90° C.

From the perspective of changing the contact angle, two conditions are necessary for constructing the water-repellent and lipophilic material, i.e., the micro-nano-scale roughness structure and the low surface energy of the material surface. According to Wenzel's theory, for a hydrophobic surface having an intrinsic contact angle of a water droplet that is greater than 90°, the greater roughness is, the larger the contact angle is, the better the water repellency is; for the same surface having an intrinsic contact angle of an oil droplet that is smaller than 90°, after the roughness is increased, the contact angle of an oil droplet is close to 0°, indicating that the lipophilicity of the surface is better.

In the present invention, water-repellent finishing of the composite needle-punched nonwoven fabric is carried out using a fluorine-free waterproofing agent, and the surface tension of the nonwoven fabric is reduced by coating the fiber surface and filling the gap between the fibers with the fluorine-free waterproofing agent having a low surface energy, to obtain a certain water-repellent effect. PET and ES/PE/PP fibers themselves have poor hygroscopicity. PET has no polar groups except for the alcoholic hydroxyl groups at both ends. In the ES bicomponent fibers, both PP and PE are non-polar structures of macromolecules, and have high crystallinity and do not contain hydrophilic groups, and thus have a certain water-repellent effect. After being finished with the fluorine-free waterproofing agent, the composite needle-punched nonwoven fabric is coated with the fluorine-free waterproofing agent at the fiber-to-fiber intersections and on the fiber surface, thereby enhancing the water-repellent effect.

In another aspect, the present invention also provides a water-repellent and lipophilic composite needle-punched nonwoven fabric prepared by the foregoing preparation method. The water-repellent and lipophilic composite needle-punched nonwoven fabric has a water contact angle of 120-150°, and each gram of the composite needle-punched nonwoven fabric can absorb 3.2-4.4 g of oil.

By means of the foregoing solutions, the present invention has the following advantages:

(1) In the preparation of the composite needle-punched nonwoven fabric, both the PET fiber and the ES/PE/PP fiber are hydrophobic fibers, and the prepared composite needle-punched nonwoven fabric has a complete appearance, the PET fiber and the polyolefin-based fiber are effectively entangled together, and the fluorine-free waterproofing agent is adhered to the fibers to prevent the fibers from absorbing water.

(2) After the water-repellent treatment, the tensile strength of the material is increased due to the increase in density. After the hot-drying treatment, the strength changes significantly, and the tensile strength of the nonwoven fabric in which the ES fiber raw material is mixed is increased.

(3) After the water-repellent treatment of the nonwoven fabric, the contact angle of the material is significantly increased. Moreover, when the blending ratio of the PET fiber to the ES fiber is 1:1, and the concentration of the fluorine-free waterproofing agent is 70 mL/L, the water repellency is the best. In the case of better water repellency, the hot-drying treatment has a certain enhancement effect on the oil absorption rate and contact angle of the nonwoven fabric.

These and other objects and advantages of the present invention will become readily apparent to those skilled in the art upon reading the following detailed description by referring to the accompanying drawings.

DETAILED DESCRIPTION OF THE PREFERRED EMBODIMENTS

Figure 1:
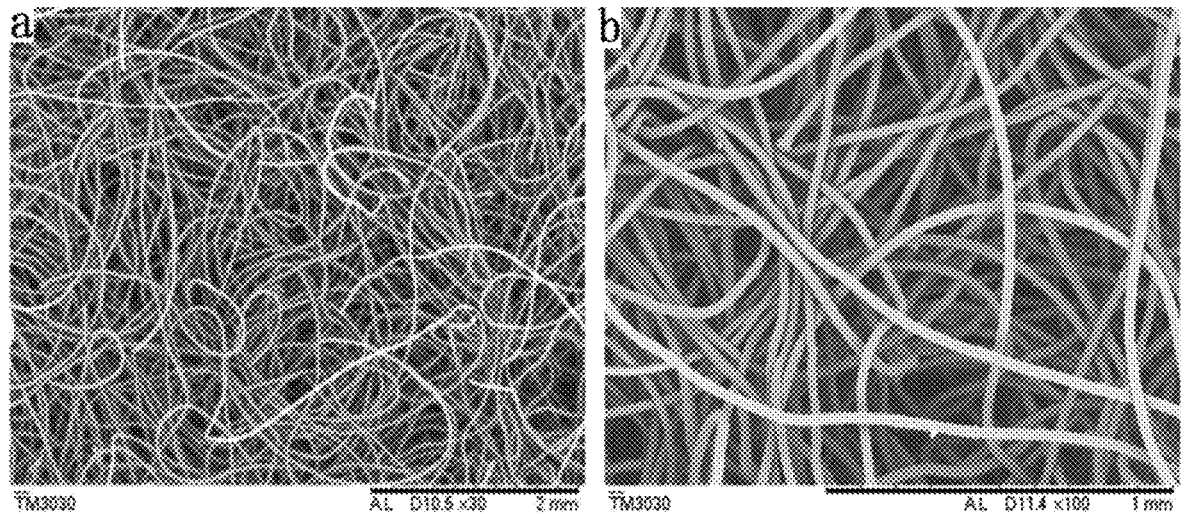
FIG. 1 is an electron micrograph of a product prepared after water-repellent finishing without hot-drying at different magnifications.

The invention will be further illustrated in more detail with reference to the accompanying drawings and embodiments. It is noted that, the following embodiments only are intended for purposes of illustration, but are not intended to limit the scope of the present invention.

In the following examples of the present invention, the PET fiber and the ES fiber are commercially available, and the non-fluorine waterproofing agent (HOLPOSON ECO- OC) is produced by Zhejiang Holposon New Materials Co., Ltd., and has a pH of 3.5-4.5. The oily wastewater is specifically prepared as follows: 1,000 mL of deionized water was poured into a beaker, and 250 mL of kerosene was slowly poured into the beaker, and stirred by a magnetic stirrer at 60 r/min for 10 min, and then the resulting solution was allowed to stand for 30 min such that water was mixed with oil to obtain the oily wastewater.

The instrument models used in the invention are as follows:

needle punching production line (Wanlong Machinery Co., Ltd., Changshu, China), universal material testing machine (Instron5967 testing machine, Instron Corporation, U.S.A), full-automatic video contact angle meter (OCA50, Dataphysics, Germany), desktop electron microscope (TM3030, Hitachi, Japan), magnetic stirrer (84-1, Shanghai Meiyingpu Instrument Manufacture Co., Ltd., China), electronic balance (Adventurer, Ohaus Instrument Co., Ltd., Germany), and oven (model WGLL-125BE, Tianjin Taisite Instrument Co., Ltd.)

Example 1

(1) Preparation of PET/ES needle-punched nonwoven fabric: a PET fiber and an ES fiber were thoroughly mixed at a mass ratio of 3:1, and then the blended fibers were processed by a needle punching process. The needle punching process were as follows: PET/ES opening and mixing→carding→lapping machine→pre-needle punching-→main needle punching, to obtain a PET/ES needle-punched nonwoven fabric. To increase the strength of the nonwoven fabric, the pre-needle-punched material was folded in half and then subjected to main needle punching. The power frequency was set as 13 Hz.

(2) A part of the PET/ES needle-punched nonwoven fabric prepared in step (1) was subjected to hot-drying treatment. The sample was placed in the oven and hot-dried at a temperature of 120° C. for 60 min.

(3) Then, the hot-dried sample was subjected to water-repellent treatment with 50 mL/L of an aqueous solution of the fluorine-free waterproofing agent, and a liquor ratio of the aqueous solution of the fluorine-free waterproofing agent to the sample was 10:1-20:1. The water-repellent finishing process was as follows: PET/ES needle-punched nonwoven fabric→two-dip two-rolling (the sample was soaked in the aqueous solution of the fluorine-free waterproofing agent for 30 s to fully wet the sample, the air pressure for a dip rolling machine was set as 1.8 kPa and the liquid carrying rate was 230%)→drying in the oven at 60° C., to obtain a water-repellent and lipophilic composite needle-punched nonwoven fabric.

Example 2

A water-repellent and lipophilic composite needle-punched nonwoven fabric was prepared according to the method of Example 1, except that in step (1), the mass ratio of the PET fiber to the ES fiber was 1:1.

Example 3

A water-repellent and lipophilic composite needle-punched nonwoven fabric was prepared according to the method of Example 1, except that in step (1), the mass ratio of the PET fiber to the ES fiber was 1:3.

Example 4

Three water-repellent and lipophilic composite needle-punched nonwoven fabrics were prepared according to the methods of Examples 1-3, except that in step (3), the concentration of the aqueous solution of the fluorine-free waterproofing agent was 60 mL/L.

Example 5

Three water-repellent and lipophilic composite needle-punched nonwoven fabrics were prepared according to the methods of Examples 1-3, except that in step (3), the concentration of the aqueous solution of the fluorine-free waterproofing agent was 70 mL/L.

Comparative Example 1

For comparison, five control samples were prepared according to the methods of Examples 1-5, except that the ES fiber used in step (1) was replaced with the PET fiber of equal mass, that is, ES:PET=0:4.

Comparative Example 2

For comparison, five controls were prepared according to the methods of Examples 1-5, except that the PET fiber used in step (1) was replaced with the ES fiber of equal mass, that is, PET:ES=0:4.

Comparative Example 3

For comparison, control samples were prepared according to the methods of Examples 1-5, except that the hot-drying treatment of step (2) was omitted.

Figure 2:
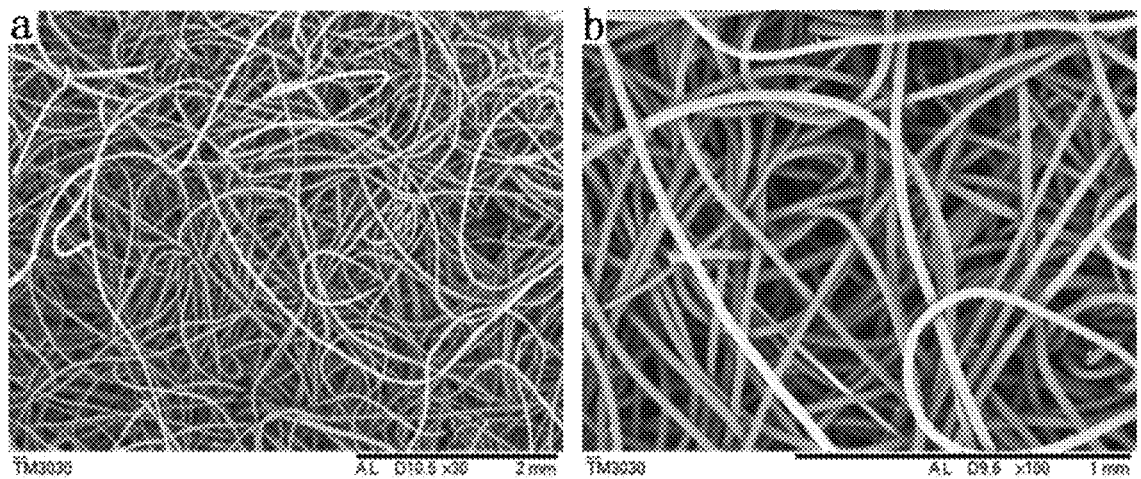
FIG. 2 is an electron micrograph of a product prepared after hot-drying treatment and water-repellent finishing at different magnifications.

The water-repellent and lipophilic PET/ES needle-punched nonwoven fabrics prepared in the foregoing examples have a gram weight of 390-750 g/m$^2$ and a thickness of about 6 mm. The fiber morphology of the prepared samples is observed by the desktop electron microscope, and the sample prepared (PET:ES=1:1) is selected as the observed object. FIGS. 1a and 1b are electron micrographs of products prepared after water-repellent finishing without hot-drying at different magnifications, respectively. FIGS. 2a and 2b are electron micrographs of products prepared after hot-drying treatment and water-repellent finishing at different magnifications. As shown in FIGS. 1 and 2, the PET and ES fibers are effectively entangled together, and the fiber morphology is clear and complete, with some breakage; there is no significant difference in the surface of the nonwoven fabric treated by hot drying at 120° C. The fluorine-free waterproofing agent is adhered to the fibers and there are still large pores between the fibers, and the well-dispersed fluorine-free polymer appears as a covering and prevents the fibers from absorbing water. Due to the influence of product thickness, density, hot air temperature, etc., it can be seen in FIGS. 1 and 2 that bonding occurs in some of the ES hot-melt fibers.

In real life, industrial waste water and oil, printing wastewater, petroleum oil spillage, etc. are the main sources of environmental pollution. The main task of oil-water separation materials is to solve such pollutants. However, it is necessary to further improve the mechanical stability, durability, etc. of the oil-water separation materials, so that the oil-water separation materials are suitable for use in various harsh environments. Therefore, the tensile properties of the sample are critical.

Tensile tests are carried out on the products prepared in the foregoing examples and comparative examples. The results are shown in Table 1. The unit of the breaking strength in Table 1 is N, and the gray shaded portions in the table are values of the breaking strength (N) of the PET/ES needle-punched nonwoven fabrics subjected to hot-drying and then water-repellent finishing.

As can be seen from Table 1, after the PET/ES needle-punched nonwoven fabric is hot-dried, it is found from the comparison of the strength of the hot-dried material and the strength of the untreated material that the tensile strength of the nonwoven fabric that is hot-dried and then subjected to water-repellent finishing is significantly different from the tensile strength of the nonwoven fabric that is only subjected to water-repellent finishing, and the tensile strengths all are improved when PET:ES=3:1, 1:1, and 1:3. When the proportions of the PET fiber and the ES fiber are the same, the breaking strength and the elongation at break of the nonwoven fabrics that are hot-dried and then subjected to water-repellent finishing are generally greater than those of the nonwoven fabrics that are only subjected to water-repellent finishing. The different proportions of the PET fiber and the ES fiber have no significant effect on the strength of the nonwoven fabrics. The hot drying improves the mechanical properties of the nonwoven fabrics with the ES fiber, and the fiber strength is enhanced. Moreover, hot drying has a significant effect on the strength when the PET/ES ratio is 1:1. The tensile properties of the nonwoven fabrics with the ES fiber are more significantly improved due to the unique characteristic of the ES fiber that the strength is increased after the ES fiber is heated.

repellent finishing with the same concentration of the fluorine-free waterproofing agent, when the proportions of the PET fiber and the ES fiber are different, the contact angles of the nonwoven fabrics are also different. The contact angle of the material is the smallest when the raw materials of the nonwoven fabric are all PET fibers, that is, the water repellency of the material is the worst. When the proportions of the PET fiber and the ES fiber are the same, the contact angle of the fiber is large, that is, the water repellency of the nonwoven fabric is stronger. The contact angle of the PET/ES needle-punched nonwoven fabric changes with the concentration of the fluorine-free waterproofing agent, and increases with the increase of the concentration of the fluorine-free waterproofing agent, that is, when the concentration of the fluorine-free waterproofing agent is set as 70 mL/L, the PET/ES needle-punched nonwoven fabric has the largest contact angle and the best water repellency.

Figure 5:
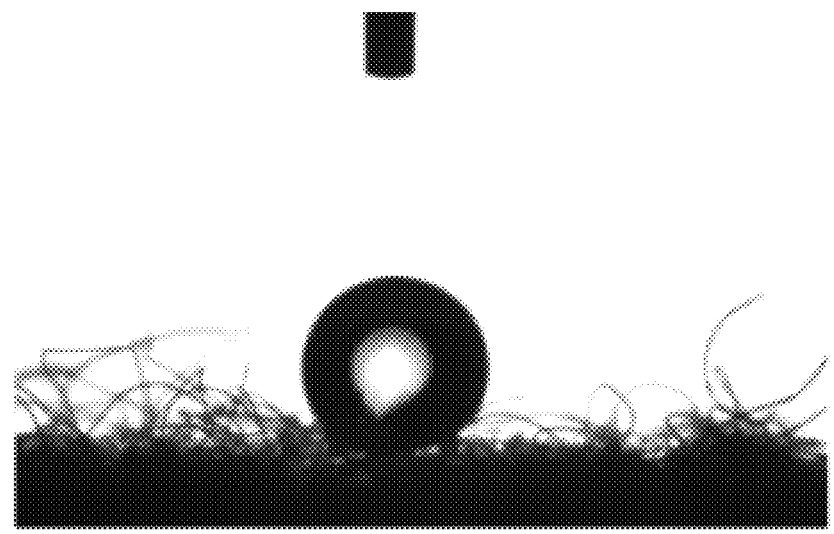
FIG. 5 shows a test result of the contact angle of a nonwoven fabric after the fabric is hot-dried and then is subjected to water-repellent finishing with a fluorine-free waterproofing agent.

FIG. 5 shows a test result of the contact angle of a nonwoven fabric after the fabric is hot-dried and then subjected to water-repellent finishing with the fluorine-free waterproofing agent (at the concentration of 70 mL/L). After the hot-drying treatment and then the water-repellent finishing, the contact angle of the fabric is 148°, which is significantly increased. To some extent, the hot-drying treatment has a certain influence on the water contact angle of the nonwoven fabric, and the water repellency of the nonwoven fabric is increased.

TABLE 1

Effects of different ratios of PET/ES and different concentrations of the waterproofing agent on the breaking strength of the PET/ES needle-punched nonwoven fabric

| Waterproofing agent finishing concentration(ml/L) | Fiber blending ratio(PET/ES) | | | | |
|---|---|---|---|---|---|
| | 4/0 | 3/1 | 2/2 | 1/3 | 0/4 |
| 0 | 128 ± 0.42 | 136 ± 0.26 | 128 ± 0.25 | 123 ± 0.32 | 122 ± 0.22 |
|   | 132 ± 0.37 | 139 ± 0.46 | 144 ± 0.23 | 132 ± 0.25 | 122 ± 0.14 |
| 50 | 132 ± 0.37 | 123 ± 0.52 | 122 ± 0.18 | 121 ± 0.41 | 112 ± 0.28 |
|    | 154 ± 0.26 | 148 ± 0.63 | 156 ± 0.37 | 162 ± 0.24 | 113 ± 0.15 |
| 60 | 127 ± 0.38 | 132 ± 0.32 | 123 ± 021 | 129 ± 0.44 | 126 ± 0.19 |
|    | 132 ± 0.15 | 140 ± 0.25 | 160 ± 0.19 | 134 ± 0.31 | 147 ± 0.36 |
| 70 | 154 ± 0.29 | 145 ± 0.23 | 125 ± 0.36 | 134 ± 0.23 | 118 ± 0.21 |
|    | 171 ± 0.32 | 150 ± 0.38 | 147 ± 0.39 | 148 ± 0.19 | 136 ± 0.35 |

In general, a surface having a water contact angle of greater than 150° and having small contact angle hysteresis is called a super-hydrophobic surface, and the contact angle is an index for determining the wettability of a nonwoven fabric. The larger the contact angle is, the worse wettability of the nonwoven fabric is, that is, the water repellency is enhanced when the water absorbency of the nonwoven fabric is worse. The nonwoven fabric has good water repellency when the water contact angle reaches 135°.

Figure 3:
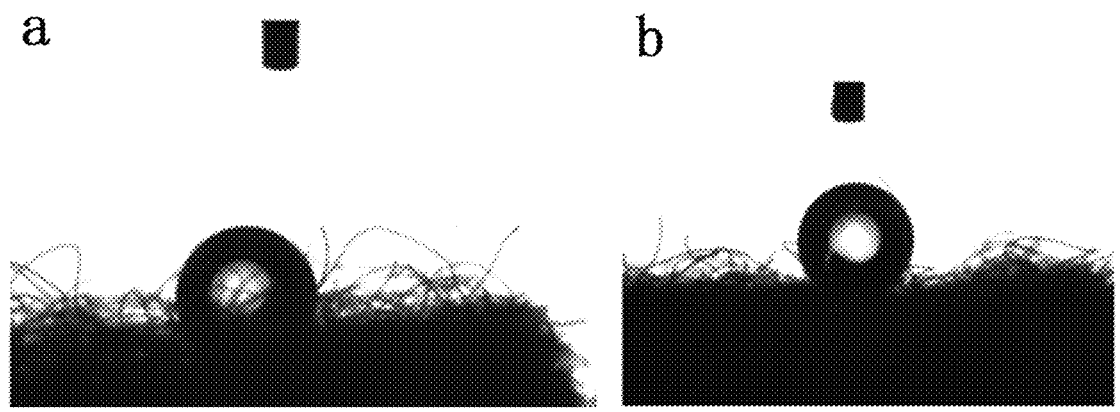
FIG. 3 is a contact angle picture of a material before and after finishing a fabric that is not hot-dried with 70 mL/L of a fluorine-free waterproofing agent.
Figure 4:
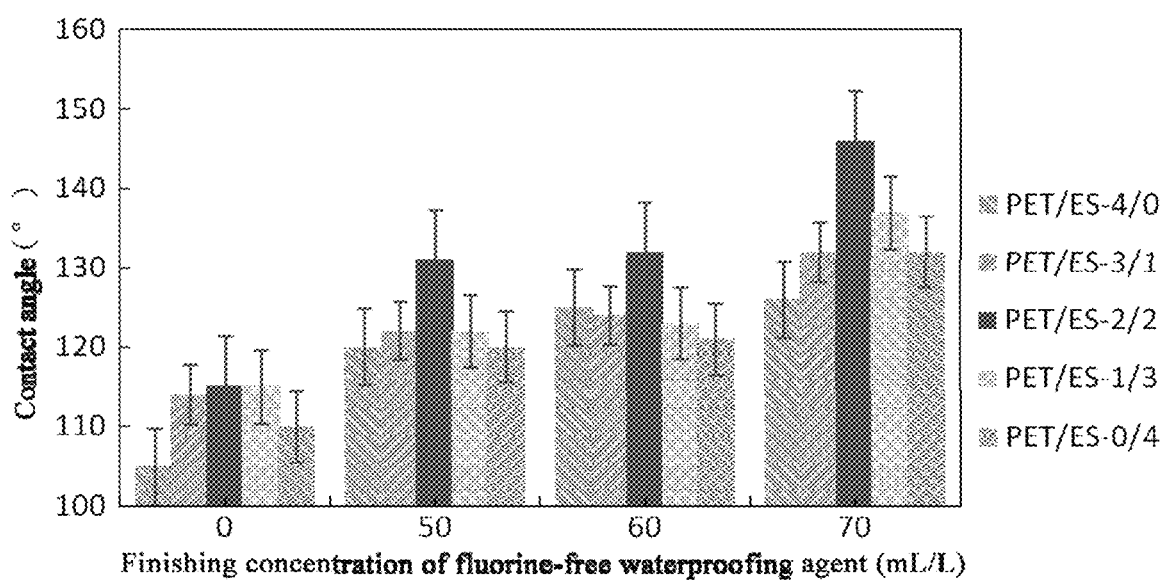
FIG. 4 shows a test result of the effect of the finishing concentration of a fluorine-free waterproofing agent on the contact angle.

FIGS. 3a and 3b are contact angle pictures of materials before and after finishing fabrics that is not hot-dried with 70 mL/L of a fluorine-free waterproofing agent (PET:ES=1:1). It can be seen from the pictures that when the water droplets fall on the water-repellent treated nonwoven fabrics, the contact angles all are large and the fabrics do not absorb the water droplets (FIG. 3b). However, when the water droplets fall on the untreated nonwoven fabrics, the contact angles are significantly smaller than the contact angles of the water-repellent treated nonwoven fabrics (FIG. 3a). FIG. 4 is shows a test result of the effect of the concentration of a fluorine-free waterproofing agent on the contact angle (after hot-drying treatment). It can be found that during the water- Further, the oil absorption rate of the prepared fabrics is measured, and the effects of the amount of the fluorine-free waterproofing agent, the raw material ratio of the PET fiber to the ES fiber, and the hot-air drying on the nonwoven fabrics are investigated. After the water contact angle of each sample is investigated, since the untreated nonwoven fabrics and the nonwoven fabrics that are only hot-dried have a small contact angle and have a certain water absorbency, in the oil absorption experiment, the absorbed part may contain two components, i.e., water and oil, and the weight determination of the nonwoven fabrics after oil absorption is not accurate, the water-repellent nonwoven fabrics that are only subjected to water-repellent treatment and the water-repellent nonwoven fabrics that are hot-dried and then subjected to water-repellent treatment are mainly focused in investigating the oil absorption rate.

Figure 6:
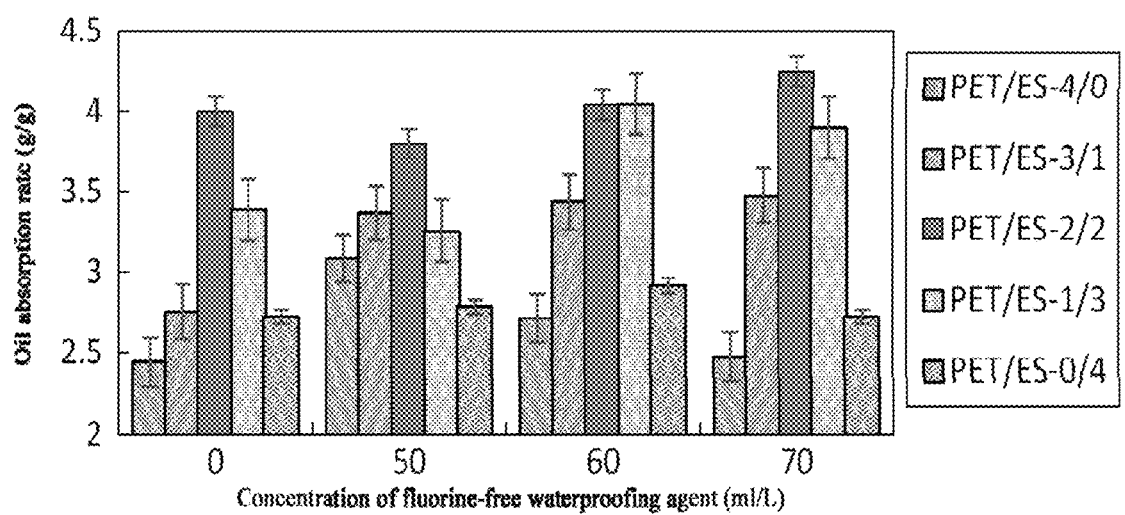
FIG. 6 shows a test result of the oil absorption rate of a needle-punched nonwoven fabric prepared by hot-drying treatment.

FIG. 6 shows a test result of the oil absorption rate of a needle-punched nonwoven fabric prepared by hot-drying treatment. It can be seen from FIG. 6 that when the raw material only consist of the PET or ES fiber, the prepared needle-punched nonwoven fabrics, after being subjected to the water-repellent finishing, have a significantly lower oil absorption rate than the PET/ES blended needle-punched nonwoven fabrics. That is, when the ratio of the PET fiber to the ES fiber is 4:0 or 0:4, the oil absorption rate of the nonwoven fabrics is the smallest, and when the proportions of the PET fiber to the ES fiber are the same, the oil absorption rate of the materials reaches a large value. Therefore, the nonwoven fabric prepared by the mixed raw material of the PET fiber and the ES fiber has better oil absorption performance than the single-fiber raw material.

Figure 7:
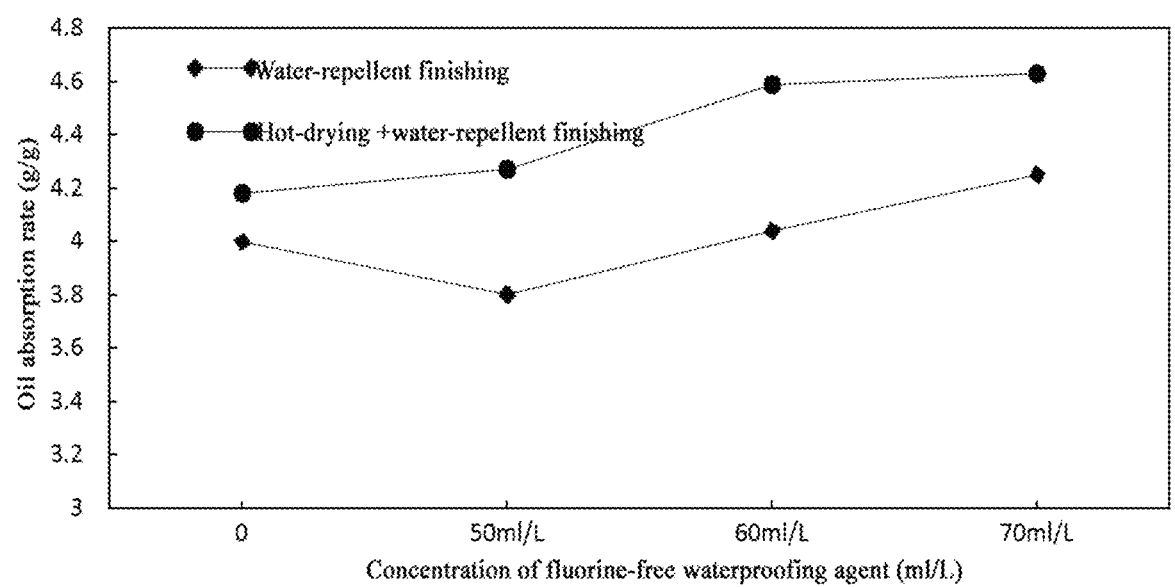
FIG. 7 shows a test result of the oil absorption rate of a water-repellent nonwoven fabric with hot-drying treatment and without hot-drying treatment.

FIG. 7 shows a test result of the oil absorption rate of a water-repellent nonwoven fabric with hot-drying treatment and without hot-drying treatment when the ratio of PET/ES is 1:1. It can be seen from FIG. 7 that the oil absorption rate curve of the nonwoven fabric that is hot-dried and then subjected to water-repellent treatment is higher than the oil absorption rate curve of the nonwoven fabric that is only subjected to water-repellent treatment, that is, under the same conditions and with the same concentration of the fluorine-free waterproofing agent, the oil absorption rate of the nonwoven fabric that is hot-dried in advance is higher than that of the nonwoven fabric that is only subjected to water-repellent treatment.

In the present invention, the PET and ES fibers are selected in the preparation of the composite needle-punched nonwoven fabric. The ES fiber may be replaced with the PP fiber and/or PE fiber, and the water-repellent and lipophilic composite needle-punched nonwoven fabric having similar properties are also obtained. The hot-drying temperature may be adjusted in the range of 110-160° C., preferably 120-130° C. The hot-drying time is preferably 60-70 min.

The above description is only preferred embodiments of the present invention and not intended to limit the present invention, it should be noted that those of ordinary skill in the art can further make various modifications and variations without departing from the technical principles of the present invention, and these modifications and variations also should be considered to be within the scope of protection of the present invention.

What is claimed is:

1. A preparation method of a water-repellent and lipophilic composite needle-punched nonwoven fabric, comprising the steps of:
   (1) blending a PET (polyethylene terephthalate) fiber and a polyolefin-based fiber in a mass ratio of 3:1-1:3, and performing needle punching to obtain a composite needle-punched nonwoven fabric;
   (2) carrying out hot-drying treatment on the composite needle-punched nonwoven fabric at 110-160° C. for 40-90 min; and
   (3) carrying out water-repellent finishing on the hot-dried fabric using 50-70 mL/L of an aqueous solution of a modified resin-based fluorine-free waterproofing agent, and drying to obtain the water-repellent and lipophilic composite needle-punched nonwoven fabric, wherein the water-repellent finishing is performed by dip rolling, the air pressure of dip rolling is 1.8 kPa and the liquid carrying rate of dip rolling is 160-230%.

2. The preparation method according to claim 1, wherein in step (1), the polyolefin-based fiber is selected from the group consisting of a polyethylene fiber, a polypropylene fiber, an ES (polyethylene polypropylene composite fiber) fiber and any combination thereof.

3. The preparation method according to claim 1, wherein in step (1), the blended fibers are processed by a needle punching process, and the needle punching process comprises the following steps:
   opening and mixing the PET fiber and the polyolefin-based fiber, carding, lapping and pre-needle punching, then folding the pre-needle-punched fabric in half to perform main needle punching.

4. The preparation method according to claim 1, wherein in step (3), the modified resin-based fluorine-free waterproofing agent is a cationic modified resin-based fluorine-free waterproofing agent, and the modified resin-based fluorine-free waterproofing agent has a pH of 3.5-4.5.

5. The preparation method according to claim 1, wherein in step (3), the modified resin-based fluorine-free waterproofing agent is a fluorine-free waterproofing agent.

6. The preparation method according to claim 1, wherein in step (3), the liquor ratio of the modified resin-based fluorine-free waterproofing agent to the fabric is 10:1-20:1.

7. The preparation method according to claim 1, wherein in step (3), the water-repellent finishing is performed by two-dip two-rolling.

8. The preparation method according to claim 1, wherein in step (3), the drying temperature is 60-90° C.

\* \* \* \* \*